United States Patent
Yoon et al.

(10) Patent No.: US 11,233,986 B1
(45) Date of Patent: *Jan. 25, 2022

(54) CHARACTERIZATION OF OPTICAL DISTORTION IN A HEAD MOUNTED DISPLAY

(71) Applicant: Facebook Technologies, LLC, Menlo Park, CA (US)

(72) Inventors: Youngshik Yoon, Cupertino, CA (US); Richard Han Soo Cho, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/353,659

(22) Filed: Mar. 14, 2019

Related U.S. Application Data

(63) Continuation of application No. 15/630,848, filed on Jun. 22, 2017, now Pat. No. 10,277,893.

(51) Int. Cl.
*H04N 17/02* (2006.01)
*H04N 5/232* (2006.01)
*H04N 5/235* (2006.01)
*H04N 5/247* (2006.01)

(52) U.S. Cl.
CPC ........... *H04N 17/02* (2013.01); *H04N 5/2356* (2013.01); *H04N 5/23219* (2013.01); *H04N 5/247* (2013.01)

(58) Field of Classification Search
CPC ...... H04N 17/02; H04N 13/385; H04N 5/247; H04N 5/2356; H04N 5/23219; H04N 17/002; H04N 17/00; H04N 17/004; H04N 13/00; G02C 9/00; G06F 3/012

USPC ............... 348/189, 180–182, 187, 188, 190
See application file for complete search history.

(56) References Cited

U.S. PATENT DOCUMENTS

| | | | |
|---|---|---|---|
| 2004/0061663 A1* | 4/2004 | Reynolds | G06F 3/012 345/8 |
| 2006/0018550 A1 | 1/2006 | Rash et al. | |
| 2011/0066239 A1* | 3/2011 | Smoot | B29D 11/02 623/6.64 |
| 2016/0225164 A1 | 8/2016 | Tomlin et al. | |
| 2016/0225191 A1* | 8/2016 | Mullins | G02B 27/0179 |
| 2016/0253795 A1* | 9/2016 | Cole | H04N 13/232 345/426 |
| 2017/0193687 A1 | 7/2017 | Lo et al. | |
| 2017/0315363 A1* | 11/2017 | Ikeda | G02B 27/0025 |

* cited by examiner

*Primary Examiner* — Sherrie Hsia
(74) *Attorney, Agent, or Firm* — Fenwick & West LLP

(57) ABSTRACT

An optical profiling system characterizes distortion of a head-mounted display (HMD) under test. The optical profiling system includes a camera assembly and a controller. The controller provides presenting instructions that cause the HMD under test to present test patterns and also provides imaging instructions that cause the camera assembly to capture images of the test patterns presented by the HMD under test. The camera assembly includes one or more characterization cameras. A characterization camera is configured to mimic movement of a human eye and is positioned in an eye box region of the HMD under test. Using the images captured by the camera assembly, the controller measures distortion of the HMD under test. The controller may generate a report charactering the HMD under test based on the measured distortion.

16 Claims, 5 Drawing Sheets

500

```
┌─────────────────────────────────────────────────────────┐
│     Instruct a HMD under test to display a test pattern │
│                          510                            │
└─────────────────────────────────────────────────────────┘
                            │
                            ▼
┌─────────────────────────────────────────────────────────┐
│  Determine imaging instructions based at least in part  │
│                  on input parameters                    │
│                          520                            │
└─────────────────────────────────────────────────────────┘
                            │
                            ▼
┌─────────────────────────────────────────────────────────┐
│  Capture one or more images of the test pattern in      │
│          accordance with the imaging instructions       │
│                          530                            │
└─────────────────────────────────────────────────────────┘
                            │
                            ▼
┌─────────────────────────────────────────────────────────┐
│  Measure distortion of the test pattern caused by one   │
│  or more optical elements in the HMD under test using   │
│                  the one or more images                 │
│                          540                            │
└─────────────────────────────────────────────────────────┘
                            │
                            ▼
┌─────────────────────────────────────────────────────────┐
│  Generate a report characterizing the one or more test  │
│             lenses based on the measured distortion     │
│                          550                            │
└─────────────────────────────────────────────────────────┘
                            │
                            ▼
┌─────────────────────────────────────────────────────────┐
│                  Provide the report to a user           │
│                          560                            │
└─────────────────────────────────────────────────────────┘
```

FIG. 5

CHARACTERIZATION OF OPTICAL DISTORTION IN A HEAD MOUNTED DISPLAY

CROSS REFERENCE TO RELATED APPLICATIONS

This application is a continuation of co-pending U.S. application Ser. No. 15/630,848, filed Jun. 22, 2017, which is incorporated by reference in its entirety.

BACKGROUND

The present disclosure generally relates to head mounted displays (HMD), and specifically to an optical profiling system that characterizes distortion in optical elements of a HMD.

Distortions caused by, e.g., optical elements (e.g., lenses) of a HMD can deform images presented by the HMD and can impair user experience. Conventionally, manufacturers of HMDs may test the optical elements to determine whether they are within design specification. But existing testing methods are divorced from design requirements stemming from a human eye viewing content through the optical elements in a HMD. Accordingly, there is no objective measure of distortion of optical elements that are incorporated into the HMD which can be used to, e.g., ensure optics are within design tolerances.

SUMMARY

An optical profiling system uses a camera assembly configured to mimic movement of one or more human eyes to characterize distortion of optical elements in a HMD under test. The camera assembly captures images of test patterns presented by the HMD under test. In addition to the camera assembly, the optical profile system also includes a controller. The controller generates imaging instructions. The HMD under test presents the test patterns in accordance with the imaging instructions, and the camera assembly captures the images in accordance with the imaging instructions. The controller also measures distortion of the HMD under test based on the captured images.

In some embodiments, the camera assembly includes a characterization camera that is configured to mimic an eye of a user of the HMD under test, such as movement of the human eye, optical qualities of a human eye, physical dimensions of a human eye, or some combination thereof. The characterization camera captures images in accordance with the imaging instructions. The imaging instructions describe one or more positions of the chracterization camera and provides instructions for a number of exposures at each of the one or more positions. The characterization camera includes an optical assembly and a sensor. The optical assembly directs light emitted from the HMD under test to the sensor, and the sensor captures the emitted light to generate images. The characterization camera may also include one or more filters that block some bands of light from being captured by the sensor. In some embodiments, the camera assembly includes an additional characterization camera that mimics movement of the other eye of the user of the HMD under test. The additional characterization camera is positioned in an additional eye box regions of the HMD under test and captures images of content presented by the HMD under test based on additional imaging instructions.

Using the images captured by the camera assembly, the controller measures distortion of one or more lenses in the HMD under test. Based on the measured distortion, the controller can further generate a report charactering the one or more lenses and/or determine whether the HMD under test is qualified. The report and/or determination may be provided to the user of the HMD under test. In some embodiments, the measured distortion may be used to pre-distort images presented by the HMD under test to offset certain types of distortion introduced by optical elements of the HMD under test.

BRIEF DESCRIPTION OF THE DRAWINGS

FIG. 5 is a flow chart illustrating a process of characterizing a HMD under test, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
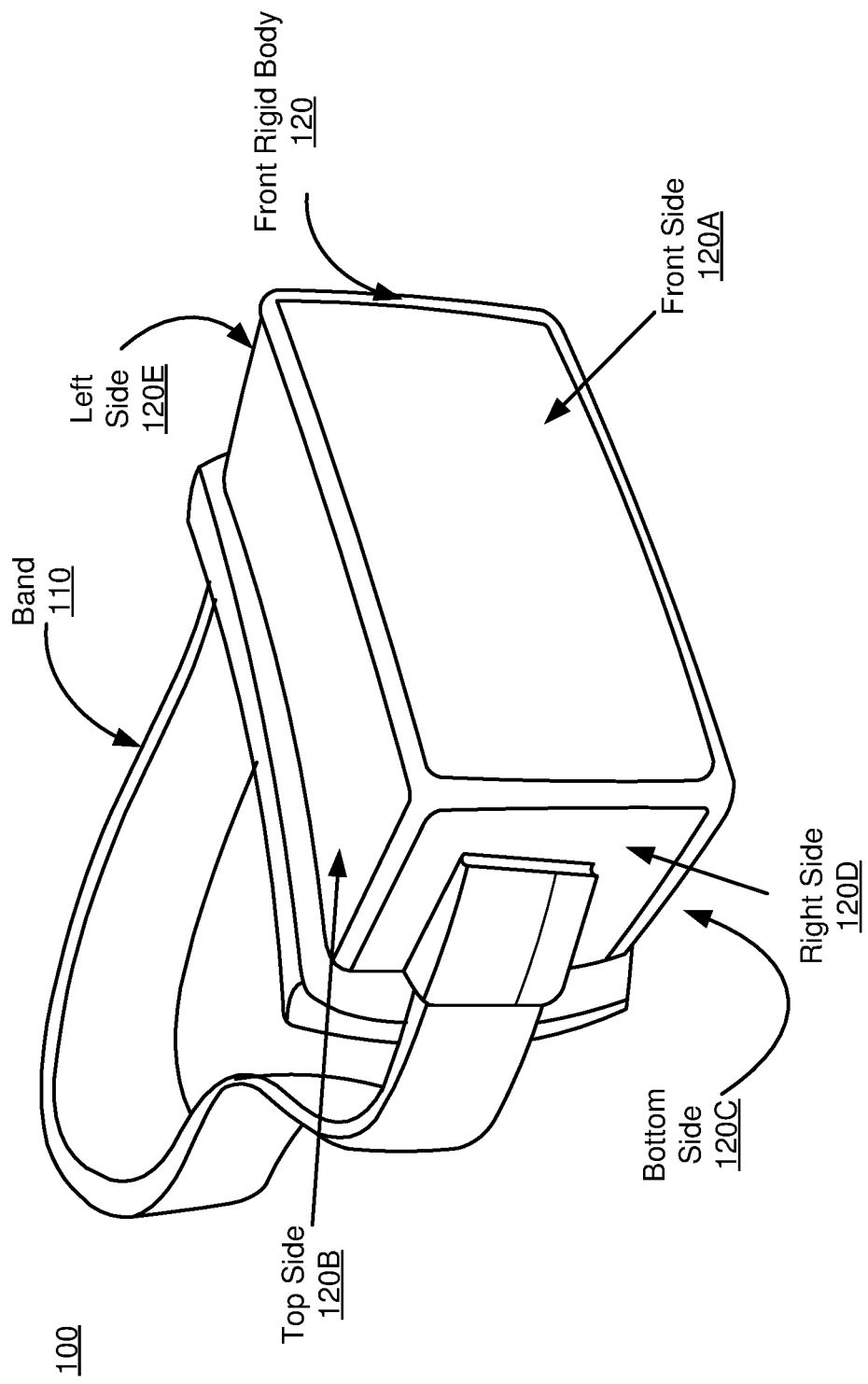
FIG. 1 is a wire diagram of a HMD, in accordance with an embodiment.

FIG. 1 is a wire diagram of a HMD 100, in accordance with an embodiment. The HMD 100 is a head-mounted display that presents media to a user comprising virtual and/or augmented views of a physical, real-world environment with computer-generated elements. Examples of the media presented by the HMD 100 include images (e.g., 2D or 3D images), video (e.g., 2D or 3D video), audio, or some combination thereof. Images and video can be presented to each of the eyes of the user by using electronic displays and optical lenses (shown in FIG. 2) of the HMD 100.

The HMD 100 may be part of, e.g., a virtual reality (VR) system, an augmented reality (AR) system, a (mixed reality) MR system, or some combination thereof. In embodiments that describe an AR system and/or a MR system, portions of the HMD 100 that are between a front side (or some other side) of the HMD 100 and an eye of the user are at least partially transparent (e.g., a partially transparent electronic display).

In the embodiment of FIG. 1, the HMD includes a band 110 and a front rigid body 120. The front rigid body 120 includes a front side 120A, a top side 120B, a bottom side 120C, a right side 120D, and a left side 120 E. The band 110, in some embodiments, has adjustable length. Between the band 110 and the front rigid body 120 of the HMD 100, there is sufficient space allowing a user to mount the HMD 100 onto the user's head. In other embodiments, the HMD 100 may include additional, fewer, or different components.

Figure 2:
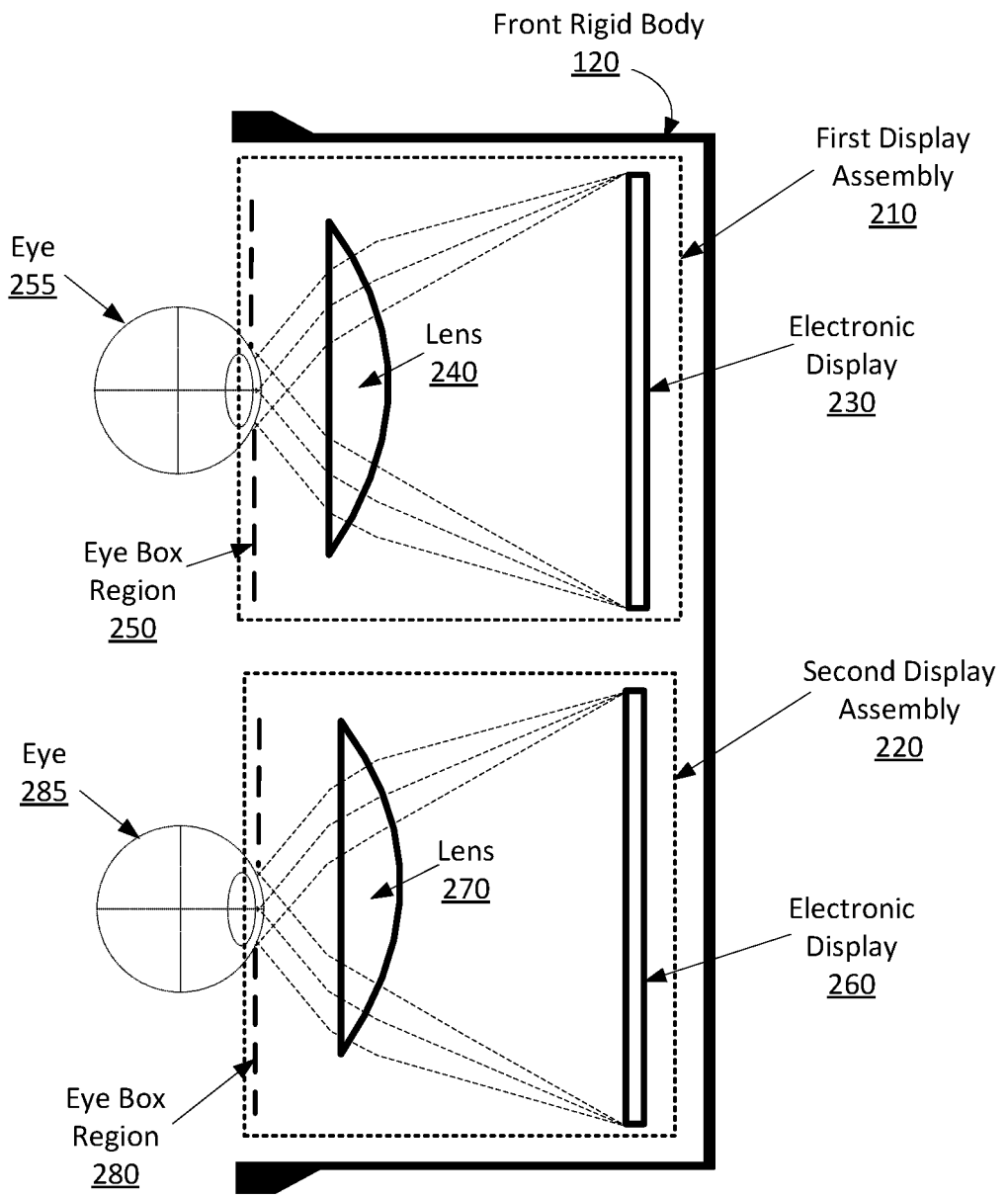
FIG. 2 shows a cross-section of a front rigid body of the HMD, in accordance with an embodiment.

FIG. 2 shows a cross-section 200 of a front rigid body 120 of the HMD 100, in accordance with an embodiment. The front rigid body 120 includes two display assemblies 210 and 220. The display assembly 210 includes an electronic display 230, a lens 240, and provides images to an eye box region 250 that corresponds to a location that would be occupied by an eye 255 of a user of the HMD 100. Similarly, the other display assembly 220 includes an electronic display 260, a lens 270, and provides images to an eye box region 280 that corresponds to a location that would be occupied by an eye 285 of a user of the HMD 100. In one embodiment, the electronics displays 230 and 260 are same electronic displays, and the lenses 240 and 270 are same lenses.

Some embodiments of the front rigid body 120 have different components than those described here. For example, the front rigid body 120 can include a depth measurement unit that determines depth information of user eyes and/or objects in a local area. As another example, the display assembly 220 can include more than one lens or other types of optical devices. Also, in some cases, functions can be distributed among the components in a different manner than is described here.

The electronic displays 230, 260 display images to the user. For example, the electronic display 230 displays a virtual object based in part on depth information of the eye 255 of the user. In various embodiments, the electronic displays 230, 260 comprises a single electronic display panel or multiple electronic display panels (e.g., a display for each eye of a user). Examples of an electronic display panel include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The lenses 240, 270 are optical elements. An optical element may be, e.g., a Fresnel lens, a convex lens, a concave lens, or any other suitable optical element that affects the image light emitted from the electronic display 230. Moreover, the lenses 240, 270 may include combinations of one or more optical elements. In some embodiments, one or more of the optical elements in the lenses 240, 270 may have one or more coatings, such as partial reflectors or anti-reflective coatings.

The lenses 240, 270 directs image light from the electronic displays 230, 260 to their respective eye box regions 250, 280. The lenses 240, 270 can also magnify received image light from the electronic displays 230, 260, and/or correct optical errors associated with the image light. However, the lenses 240, 270 may not be optically perfect and can actually introduce distortion into the images presented to the user. Distortion may include, e.g., barrel distortion, pincushion distortion, longitudinal chromatic aberration, transverse chromatic aberration, spherical aberration, field curvature, astigmatism, or any other type of two-dimensional or three-dimensional optical error. Such distortion can affect optical characteristics of the lenses 240, 270, e.g., resolution, illumination uniformity, color variation, focus differentiation, chromatic aberration, spherical aberration, astigmatism, and field curvature.

An optical profiling system described hereinafter characterizes distortion in HMDs. The characterization may be used to, e.g., pre-distort images presented by the electronic displays 230, 260 to offset certain types of distortion introduced by the lenses 240, 270.

Figure 3:
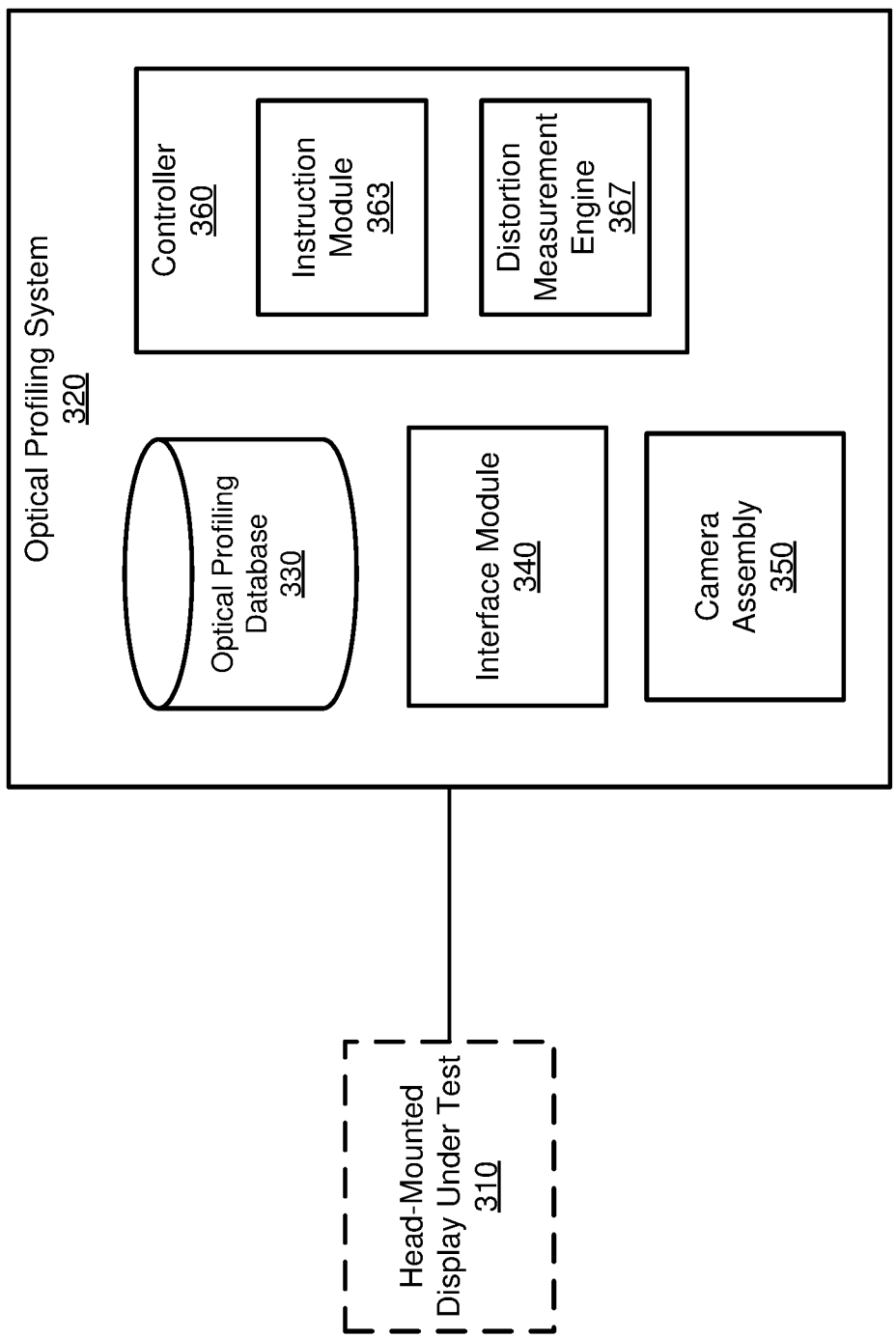
FIG. 3 shows a block diagram of an optical profiling system that characterizes distortion of a HMD under test, in accordance with an embodiment.

FIG. 3 shows a block diagram of an optical profiling system 320 that characterizes distortion of a HMD under test 310, in accordance with an embodiment. The optical profiling system 320 measures distortion of one or more optical elements of the HMD under test 310. The optical profile system 320 can also be used to characterize optical elements of other HMDs. The optical profiling system 320 includes an optical profiling database 330, an interface module 340, a camera assembly 350, and a controller 360. In other embodiments, the optical profiling system 320 may include additional, fewer, or different components. Similarly, the functions can be distributed among the components and/or different entities in a different manner than is described here.

The HMD under test 310 presents test patterns for characterizing distortions of lenses in the HMD under test 310. Examples of the test patterns include dot pattern, star pattern, grid pattern, checkerboard pattern, sine pattern, bar pattern, text pattern, etc. In one embodiment, the HMD under test 310 is the HMD 100 described in conjunction with FIGS. 1 and 2. In some embodiments, the HMD under test 310 includes additional or fewer components than the HMD 100. For example, the HMD under test 310 does not include the band 110. The HMD under test 310 presents the test patterns in accordance with instructions generated by the optical profiling system 320.

The optical profiling database 330 stores information related to distortion characterization by the optical profiling system 320. The stored information includes test patterns, model images of the test patterns, instructions for the HMD under test 310, instructions for the camera assembly 350, images captured by the camera assembly 350, measured distortion, and distortion maps. The stored information may also include information describing the HMD under test 310 and/or its lenses, such as a reference number, an ID, manufacturing time, or other types of information. The description information can be used to identify the HMD under test 310 and/or its lenses.

The interface module 340 facilitates communications of the optical profiling system 320 with operators and/or the HMD under test 310. For example, input parameters can be received via the interface module 340, e.g., from an operator of the optical profiling system 320 or a module associated with the optical profiling system 320. Input parameters are parameters received by the optical profiling system 320 for distortion characterization. Input parameters are parameters that the optical profiling system 320 uses to characterize the HMD under test 310. In some embodiments, input parameters identify one or more types of distortion to measure. Input parameters can include, e.g., resolution, illumination uniformity, color variation, focus differentiation, chromatic aberration, spherical aberration, astigmatism, and field curvature. In some embodiments, the input parameters may also identify one or more types of human eye movements. Examples of human eye movements include eye rotation, saccade, smooth pursuit movement, vergence movement, and vestibulo-ocular movement. As another example of facilitating communication, the interface module 340 can provide instructions generated by the optical profiling system 320 to the HMD under test 310.

The camera assembly 350 includes one or more characterization cameras that capture images of test patterns presented by the HMD under test 310 (i.e., images presented by an electronic display through one or more lenses) in accordance with imaging instructions. A characterization camera is a camera configured to mimic a human eye that is used to characterize lenses of a HMD under test. A characterization camera is configured to mimic movement of the human eye, optical qualities of a human eye, physical dimensions of a human eye, or some combination thereof. For example, the characterization camera may have multiple degrees of freedom of movement in order to, e.g., change orientation about a center of rotation in the same manner as a human eye changes orientation. And different positions (e.g., orientations) of the characterization camera could correspond to different gaze angles of a human eye. Additionally, in some embodiments where there are two characterization cameras to mimic the left and right eyes of a user, the two characterization cameras are able to translate relative to each other to, e.g., measure effects of inter-pupillary distance (IPD) on the device under test. For example, an IPD between the two characterization cameras may be adjusted over some range of values. In alternate embodiments, the IPD may be fixed at a particular distance (e.g., 63.5 mm). In some embodiments, a characterization camera may translate away from or closer to the device under test. This would, e.g., measure effects of different eye relief on the images presented by the device under test.

In some embodiments, a characterization camera mimics optical qualities of the human eye. For example, the characterization camera can have a circular aperture that is sized (e.g., ~1.5-8 mm in diameter) and has approximately +/−80° field of view to match that of a pupil in a human eye. Moreover, in some embodiments, the aperture is adjustable over a range of diameters so that the optical profiling system 320 is able to, e.g., characterize one or more lenses in the HMD under test 310 under conditions corresponding to different pupil dilations.

The characterization camera includes an optical assembly and a sensor. The optical assembly directs light from the HMD under test 310 to the sensor. The optical assembly includes one or more optical elements that focus image light from the HMD under test 310 on the sensor. Functionally, the optical assembly corresponds to that of a cornea and crystalline lens focusing light on a retina of the eye. And a field of view of a characterization camera can be matched to a human eye (46° superior (up, limited by the brow), 45° nasal (limited by the nose), 70° inferior (down), and 100° temporal (towards the temple)) or some other values (e.g., 40° superior, 50° nasal, 50° inferior, and 40° temporal). In embodiments, where two characterization cameras are used to replicate left and right eyes for a user, the combined FOV (binocular) may be approximately 100° vertical and 200° horizontal to replicate the combined human FOV. In some embodiments, the optical assembly may be able to adjust a focal distance of the characterization camera to simulate an eye accommodating to different focal planes.

The sensor is configured to be sensitive to light emitted by the electronic display (i.e., visible light). The sensor captures the emitted light and generate images based on the captured emitted light. In some embodiments, the sensor is configured to have a resolution of at least that of human eye (e.g., angular resolution of ~1 arcminute). In some embodiments, the sensor may be curved in two dimensions to replicate the curvature of a retina. Additionally, in some embodiments, pixel layout on the sensor simulates rod/cone layout on a human retina. For example, the senor may include a high resolution area that is surrounded by a lower resolution area, where the high resolution corresponds to a foveal region of a human eye. And in some embodiments, the sensor may also include a filter that replicates color sensitivity as a function of position on the sensor. For example, in the human eye, cones are sensitive to color and have a highest density near a foveal region of the retina. Additionally, different types of cones are sensitive to different types of colors. In a similar manner, the filter coupled to the display may be patterned to match cone layout on a retina.

In some embodiments, the characterization camera may include one or more filters that pass certain bands of light while blocking other bands of light. For example, the characterization camera could include, e.g., a red bandpass filter (passes red light and blocks green and blue light), a blue bandpass filter, and a green bandpass filter, and a mechanism to select or de-select on or more of the filters. In cases where all of the bandpass filters are de-selected then unfiltered light from the HMD under test is imaged on the sensor. In some embodiments, a form factor of a characterization camera mimics physical dimensions of a human eye. For example, the distance between the outer surface of the optical assembly and the sensor may correspond to a distance between the cornea and the retina in a human eye (~17 mm). Similarly, the characterization camera may have a center of rotation that is located in a same position between the optical assembly and the sensor as a location of a center of rotation between the retina and the cornea.

The camera assembly 350 controls one or more characterization cameras in accordance with imaging instructions provided by the controller 360. Imaging instructions are instructions that control how one or more characterization cameras collect data. Imaging instructions may control, e.g., a position of one or more characterization cameras (e.g., eye relief, IPD, and/or gaze angle), an aperture size of a characterization camera, bandpass filter selection/de-selection, focal distance, exposure settings (e.g., sensor gain, exposure length), frame rate, image timing, number of images taken at each position, some other feature of one or both of the characterization cameras, or some combination thereof. For example, after receiving the imaging instructions, the camera assembly 350 can move a characterization camera to a first position described in the imaging instructions and complete a number of exposures for the first position as provided in the imaging instructions. Then the camera assembly 350 can move the characterization camera to a second position described in the imaging instructions and completes a number of exposures for the second position. Different positions may be associated with different numbers of exposures. The camera assembly 350 repeats this process until all positions in the imaging instructions are done.

The controller 360 controls the HMD under test 310 and components of the optical profiling system 320. The controller 360 includes an instruction module 363 and a distortion measurement engine 367. Alternatively, the controller 360 may include additional, fewer, or different components. Similarly, the functions can be distributed among the components and/or different entities in a different manner than is described here.

The instruction module 363 generates presenting instructions. In some embodiments, the instruction module 363 receives the presenting instructions from a user of the optical profile system 320, e.g., via the interface module 340. The presenting instructions specify one or more test patterns for the HMD under test 310 to present. The presenting instructions may also provide a length of presentation time for each specified test pattern. In some embodiments, the instruction module 363 selects test patterns based on types of distortion identified in the input parameters. The instruction module 363 generates the imaging instructions using the input parameters. For example, the imaging instruction module 363 may select a black bar pattern in response to an input parameter corresponding to assess chromatic aberration or select a grid pattern in response to an input parameter corresponding to assess pupil swim. In some other embodiments, the instruction module 363 selects test patterns based on effects of distortion identified in input parameters. For example, a checkerboard pattern is selected for contrast, a bar pattern is selected for resolution, a grid pattern is selected for geometrical distortion, a start pattern is selected for focus differentiation. The instruction module 363 may generate a test chart that includes test patterns for multiple types of distortion (or effects of distortion) identified in the input parameters, and generate presenting instructions that would cause the HMD under test 310 to present the test chart. The instruction module 363 provides the presenting instructions to the HMD under test 310.

The instruction module 363 generates imaging instructions using the input parameters. The imaging instructions cause the camera assembly 350 to capture images of the test patterns presented by the HMD under test 310. The instruction module 363 determines the imaging instructions based on the input parameters. For example, the instruction module 363 generates imaging instructions that cause a characterization camera to rotate, in response to an input parameter corresponding to assess pupil swim or local performances (e.g., sharpness, chromatic aberration, etc.). The imaging instructions can, e.g., specify positions at which one or more characterization cameras of the camera assembly 350 capture images, timing to capture images, how many images are taken at each of the positions, some other command for the one or more characterization cameras, or some combination thereof. A position can include both translational moment and orientation, such as eye relief, IPD, and gaze angle. For example, for a given eye relief and IPD, the imaging instructions can cause a characterization camera of the camera assembly 350 to cycle through a range of angle values in pitch, yaw, and roll that correspond to ranges in angle similar to that of a human eye. The imaging instructions can then cause the camera assembly 350 to move to a different IPD and/or eye relief position and do it again. Additionally, the imaging instructions can cause the characterization camera to set to different aperture sizes, exposure settings, and/or frame rates. In embodiments where a characterization camera includes a bandpass filter, the imaging instructions control the characterization camera to select or deselect a bandpass filter. The instruction module 363 provides the imaging instructions to the camera assembly 350.

The distortion measurement engine 367 measures distortion of one or more lens of the HMD under test 310 using images captured by the camera assembly 350. In some embodiments, for each test pattern presented by the HMD under test 310, the distortion measurement engine 367 compares an image of a test pattern captured by the camera assembly 350 to a model image of the test pattern for the specific position where the image was captured. The specific position can be a specific gaze angle for a specific eye relief distance and a specific IPD distance. The distortion measurement engine 367 can retrieve the model image from a data base (e.g., the optical profiling database 330). Alternatively, the distortion measurement engine 367 can generate the model image based on design specifications for the HMD under test 310 and its lenses. For example, in an embodiment where the HMD under test 310 is instructed to present a grid pattern for measuring geometrical distortion and the design specification of the HMD under test 310 indicates that its lenses have some percentage amount of geometrical distortion, the distortion measurement engine 367 generates a model image including a grid pattern that is geometrically distorted in the same manner as specified by the design specification. In some embodiments, generation of the model image may also be based on accommodation state. The model image can also be an image of the same test pattern presented by a model HMD that is known to meet the design specification, and the image is captured at a same position by a same characterization camera.

Further, the distortion measurement engine 367 measures one or more types of distortion in the image using the model image. The distortion measure engine 367 compares the image with the model image. For example, the distortion measure engine 367 identifies an amount of chromatic aberration by looking at how the image changes for different colors (red, green or blue). As another example, the distortion measurement engine 367 measures filed curvature by looking at how focus of the camera changes as a function of it being off axis. As another example, the distortion measurement engine 367 identifies pupil swim by looking at differences between a captured image and a model image captured at a nominal eye position or zero eye rotation.

In some embodiments, the distortion measurement engine 367 measures distortion based on multiple images of the test pattern captured by the camera assembly 350. For example, the distortion measurement engine 367 measures distortion based on each captured image and determine an average of the measured distortion. Similarly, the distortion measurement engine 367 may use multiple model images for the test pattern. Besides using the model image, the distortion measurement engine 367 may generate a MTF (modulation transfer function) chart based on the captured image. Using the MTF chart, the distortion measurement engine 367 can measure distortion in the lenses of the HMD under test 310.

In some embodiments, the distortion measurement engine 367 takes remedial actions based on measured distortion. For example, the distortion measurement engine 367 pre-distorts the image of the display to account for some or all of the measured distortion. For example, pupil swim can be corrected by image processing on display.

The distortion measurement engine 367 further generates a report that characterizes the lens based on the measured distortion. For example, the report includes the types of the measured distortion and quantitative or qualitative measurement results. The report may also include some captured images. The distortion measurement engine 367 can also further determine whether the HMD under test 310 is qualified based on the measured distortion. For example, the distortion measurement engine 367 compares the measured distortion with corresponding design tolerance. The HMD under test 310 is determined qualified when the measured distortion is within the design tolerance; otherwise, the HMD under test 310 is determined unqualified. The report and/or determination provides an objective measure of distortion of optical elements that are incorporated into an HMD. The report and/or determination may be provided to an operator of the optical profiling system 320 or a user of the HMD under test 310.

Figure 4:
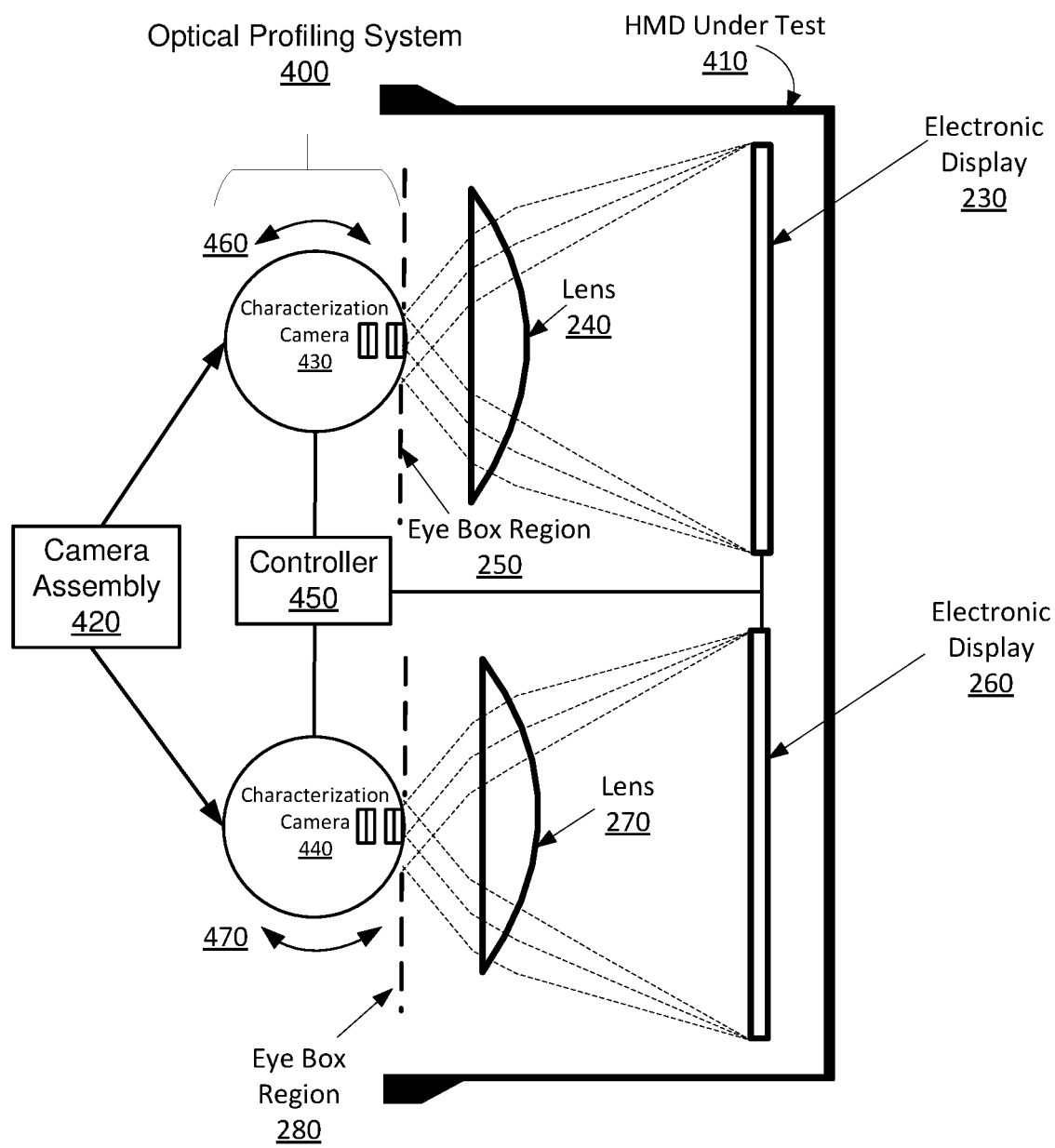
FIG. 4 illustrates an optical profiling system including two characterization cameras for characterizing a HMD under test, in accordance with an embodiment.

FIG. 4 illustrates an optical profiling system 400 including two characterization cameras 430 and 440 for characterizing a HMD under test 410, in accordance with an embodiment. The optical profiling system includes a camera assembly 420, including the two characterization cameras 430 and 440, and a controller 450.

The HMD under test 410 is an embodiment of the HMD 100. The HMD under test 410 is configured to present one or more test patterns in accordance with instructions from the controller 450. Additionally, in some embodiments, the HMD under test 410 may offset one or more types of distortion that would otherwise occur in accordance with instructions from the controller 450. For example, the HMD under test 410 may present pre-distorted content that offsets distortion introduced by one or both of the lenses 240, 270. Additionally, in embodiments, where the HMD under test 410 has varifocal capabilities (e.g., ability to dynamically adjust a distance between a lens and corresponding electronic display), the HMD under test 410 may adjust the distance between one or both of the lenses 240, 270 and their corresponding electronic displays 230, 260 to correct for distortion in accordance with instructions from the controller 450.

The camera assembly 420 captures, in accordance with instructions from the controller 450, images of test patterns presented by the HMD under test 410. The characterization cameras 430 and 440 are configured to mimic a left eye and a right eye of a user of the HMD under test 410. For example, each characterization camera can mimic movement, optical qualities, and/or physical dimensions of a human eye. While capturing the images, the characterization cameras 430 and 440 are positioned in the eye box regions 250 and 280 of the HMD under test 410 and can move to different positions in the eye box regions 250 and 280. For example, the characterization cameras 430 and 440 can move towards or away from each other to simulate different IPDs. The characterization cameras 430 and 440 can also move towards or away from the lenses 260 and 270 to simulate different eye relief distances. Additionally, each of the characterization cameras 430 and 440 may rotate, as shown by arrows 460 and 470 in FIG. 4, to simulate different gaze angles. In one embodiment, each of the characterization cameras 430 and 440 has a degree of freedom of up to 60°.

In some embodiments, each of the characterization cameras 430 and 440 includes an optical assembly and a sensor. The optical assembly directs light arriving in the eye box region 250 or 280 to the sensor. The sensor captures the light and generates images using the light. The sensor is sensitive to light and has a resolution of at least that of a human eye. In some embodiments, the characterization cameras 430 and 440 may further include filters that pass certain bands of light while blocking other bands of light. In one embodiment, the camera assembly 420 is the camera assembly 350 described in conjunction with FIG. 3.

The controller 450 provides presenting instructions that cause the HMD under test 410 to present test patterns and imaging instructions that cause the camera assembly 420 to captures images of the test patterns. In some embodiments, the presenting instructions and imaging instructions are received from a user of the HMD under test 410. Alternatively, the presenting instructions and imaging instructions are generated by the controller 450, e.g., based on input parameters received by the controller 450.

The presenting instructions control a test pattern to present by one or more of the electronic displays 230 and 240 and/or presentation time of the test pattern. Either or both of the two electronic display 230 and 240 display the test pattern and emits image light. As shown in FIG. 4, image light emitted from the electronic display 230 goes through the lens 240 and arrives at the eye box region 250. Similarly, image light emitted from the electronic display 260 goes through the lens 270 and arrives at the eye box region 280.

The imaging instructions control a position of one or more of the characterization cameras 430 and 440, an aperture size of a characterization camera, bandpass filter selection/deselection, focal distance, exposure settings (e.g., sensor gain, exposure length), frame rate, image timing, number of images taken at each position, and/or some other feature of one or both of the characterization cameras. For example, the imaging instructions describe positions for both the characterization cameras 430 and 440 and the positions correspond to different IPD values.

In one embodiment, the controller 450 generate first imaging instructions for the characterization camera 430 and second instructions for the characterization camera 440. The first imaging instruction include positions for the characterization camera 430, and the second imaging instructions include corresponding positions of the second camera characterization 440. The characterization cameras 430 and 440 move to each position in the first and second imaging instructions, resulting in a different IPD value. The first and second imaging instructions further provide a number of exposures for each position of the characterization cameras 430 and 440. Sometimes, one of the two characterization cameras 430 and 440 moves and the other one does not move. For example, a position of the characterization camera 430 corresponds to multiple positions of the characterization camera 440 (or the other way), resulting in multiple IPD values. The characterization camera 430 may capture multiple images at the position through multiple exposures so that the characterization camera 430 captures at least one image for each IPD value. The characterization cameras 430 and 440 can each be the characterization camera described in conjunction with FIG. 3.

Images captured by the two characterization cameras 430 and 440 imitates views of the two eyes of the user. Using the images captured by the camera assembly 420, the controller 450 measures distortions of the lenses 240 and 270 of the HMD under test 410. Thus, distortion measured by the controller 450 can reflect distortion that would be observed by the user. In some embodiments, the controller 450 measures distortion of the HMD under test 410 by comparing the captured images with one or more model images. In one embodiment, the distortion of the two lenses 240 and 270 can be measured simultaneously.

FIG. 5 is a flow chart illustrating a process 500 of characterizing a HMD under test, in accordance with an embodiment. In some embodiments, the process 500 is performed by an optical profiling system 320. In alternative embodiments, some of the process can be performed by another device. Likewise, embodiments may include different and/or additional steps, or perform the steps in different orders.

The optical profiling system 320 instructs 510 a HMD under test to display a test pattern. In some embodiments, the optical profiling system 320 provides presenting instructions to the HMD under test. The presenting instructions cause the HMD under test to present the test pattern. The presenting instructions can be determined based on input parameters that identify one or more types of distortion to measure. For example, optical profiling system 320 instructs the HMD under test to display a black bar pattern upon receiving input parameters that identify chromatic aberration as a type of distortion to measure.

The optical profiling system 320 determines 520 imaging instructions based at least in part on input parameters. In some embodiments, the input parameters identify one or more types of eye movements. Based on the eye movements, the optical profiling system 320 determines imaging instructions that control positions, aperture sizes, selection/deselection of bandpass filters, focal distances, exposure settings, frame rate, image timing, number of images taken at each position, and/or some other feature of one or more characterization cameras of the optical profiling system 320. The imaging instructions cause the one or more characterization cameras to capture images.

The optical profiling system 320 captures 530 one or more images of the test pattern in accordance with the imaging instructions. For example, the one or more characterization cameras of the optical profiling system 320 capture the one or more images. A characterization camera mimics a human eye. A characterization camera may include an optical element and a sensor. The optical element directs light to the sensor, and the sensor collects the light and generates images with the light. In some embodiments, the optical profiling system 320 includes two characterization cameras that mimic a left eye and a right eye of a user of the HMD under test.

The optical profiling system 320 further measures 540 distortion of the test pattern caused by one or more optical elements in the HMD under test using the one or more images. For example, the optical profiling system 320 obtains a model image and determines distortion of the test pattern based on a comparison of the captured images with the model image. The model image may be retrieved from a database by the optical profiling system 320. Alternatively, the optical profiling system 320 generates the model image based on the test pattern, the type of distortion to measure, positions of the characterization camera capturing the images, or any combination thereof.

The optical profiling system 320 generates 550 a report charactering the one or more test lenses based on the measured distortion. The report includes one or more types of distortion and measured values for each type of distortion. In some embodiments, the report can also include a captured image of the test pattern presented by the HMD under test. The optical profiling system 320 provides 560 the report to a user, e.g., a user of the HMD under test.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A camera assembly comprising:
a characterization camera positioned in an eye box region of a head-mounted display (HMD) under test and configured to imitate movement of a human eye,
wherein the camera assembly is configured to:
capture one or more images of content presented by the HMD in accordance with imaging instructions describing one or more positions of the characterization camera, wherein the imaging instructions include a plurality of positions for the characterization camera and corresponding positions for a second characterization camera that together correspond to different inter-pupillary distance values, and the one or more images are used to measure distortion of one or more optical elements in the HMD under test, the content presented by the HMD under test comprising a test pattern determined based on the distortion.

2. The camera assembly of claim 1, wherein the characterization camera comprises a plurality of color filters that selectively filter out different colors from the content in accordance with the imaging instructions.

3. The camera assembly of claim 1, wherein the characterization camera is configured to imitate movement of the human eye in at least three degrees of freedom.

4. The camera assembly of claim 1, wherein the characterization camera is configured to mimic optical qualities of the human eye, the optical qualities including one of the following: size of aperture, shape of aperture, and field of view.

5. The camera assembly of claim 1, wherein the characterization camera is configured to mimic physical dimensions of the human eye.

6. The camera assembly of claim 1, wherein the imaging instructions further describe a number of exposures at each of the one or more positions of the characterization camera.

7. The camera assembly of claim 1, wherein measuring distortion of the one or more optical elements comprises assessing at least one of the following: resolution, illumination uniformity, color variation, focus differentiation, chromatic aberration, spherical aberration, astigmatism, and field curvature.

8. The camera assembly of claim 1, wherein the imaging instructions are generated based at least in part on parameters identifying one or more types of human eye movements.

9. A camera assembly comprising:
- a first characterization camera positioned in a first eye box region of a head-mounted display (HMD) under test and configured to imitate movement of a first human eye; and
- a second characterization camera positioned in a second eye box region of the HMD under test and configured to imitate movement of a second human eye,
- wherein the camera assembly is configured to:
  - capture one or more images of content presented by the HMD in accordance with imaging instructions describing positions of the first characterization camera and the second characterization camera, the imaging instructions include a plurality of positions for the first characterization camera and corresponding positions for the second characterization camera that correspond to different inter-pupillary distance values, and the one or more images are used to measure distortion of one or more optical elements in the HMD under test, the content presented by the HMD under test comprising a test pattern determined based on the distortion.

10. The camera assembly of claim 9, wherein the first characterization camera or the second characterization camera each comprises a plurality of color filters that selectively filter out different colors from the content in accordance with the imaging instructions.

11. The camera assembly of claim 9, wherein the first characterization camera is configured to imitate movement of the first human eye in at least three degrees of freedom and the second characterization camera is configured to imitate movement of the second human eye in at least three degrees of freedom.

12. The camera assembly of claim 9, wherein the first characterization camera is configured to mimic optical qualities of the first human eye and the second characterization camera is configured to mimic the optical qualities of the second human eye, the optical qualities including one of the following: size of aperture, shape of aperture, and field of view.

13. The camera assembly of claim 9, wherein the first characterization camera is configured to mimic physical dimensions of the first human eye and the second characterization camera is configured to mimic physical dimensions of the second human eye.

14. The camera assembly of claim 9, wherein the imaging instructions further describe a number of exposures at each of the one or more positions of the first characterization camera and the second characterization camera.

15. The camera assembly of claim 9, wherein the imaging instructions are generated based at least in part on parameters identifying one or more types of human eye movements.

16. A camera assembly comprising:
- a first characterization camera positioned in a first eye box region of a head-mounted display (HMD) under test and configured to imitate movement of a first human eye; and
- a second characterization camera positioned in a second eye box region of the HMD under test and configured to imitate movement of a second human eye,
- wherein the camera assembly is configured to:
  - capture one or more images of content presented by the HMD in accordance with imaging instructions describing positions of the first characterization camera and the second characterization camera that correspond to different inter-pupillary distance (IPD) values, and the one or more images are used to measure distortion of one or more optical elements in the HMD under test at the different IPD values.

* * * * *